US008229826B2

United States Patent
Joseph

(10) Patent No.: US 8,229,826 B2
(45) Date of Patent: Jul. 24, 2012

(54) COLLATERAL TRUST MANAGEMENT SYSTEM

(76) Inventor: Viju Joseph, Westbrookville, NY (US)

( * ) Notice: Subject to any disclaimer, the term of this patent is extended or adjusted under 35 U.S.C. 154(b) by 239 days.

(21) Appl. No.: 12/731,363

(22) Filed: Mar. 25, 2010

(65) Prior Publication Data

US 2010/0250466 A1 Sep. 30, 2010

Related U.S. Application Data

(60) Provisional application No. 61/163,870, filed on Mar. 27, 2009.

(51) Int. Cl.
*G06Q 40/00* (2012.01)
(52) U.S. Cl. .................................. 705/36 R
(58) Field of Classification Search ............ 705/35, 705/36 R, 37, 38
See application file for complete search history.

(56) References Cited

U.S. PATENT DOCUMENTS

| 7,139,730 | B1 | 11/2006 | Shimko et al. |
| 2005/0044035 | A1 | 2/2005 | Scott |
| 2005/0086149 | A1 | 4/2005 | Efron et al. |
| 2005/0234816 | A1 | 10/2005 | Hendrix |
| 2007/0073613 | A1 | 3/2007 | Lee |
| 2008/0288295 | A1 | 11/2008 | Caballero et al. |

FOREIGN PATENT DOCUMENTS

WO WO2004029761 A2 4/2004

OTHER PUBLICATIONS

Cohen, L: When a prime broker fails—Critical issues for fund managers in the Lehman bankruptcy, Corporate & Finance Alert, Oct. 1, 2008, pp. 1-6.*
Ng et al.: Hedge fund and UK prime brokers in the post-Lehman environment, Sydney Austin LLP, London, United Kingdom, Dec. 2, 2008, pp. 1-5.*
Bank of New York: Securities Servicing—Collateral Management, The Bank of New York Company, Inc., New York, 2005, pp. 1-6.*

* cited by examiner

*Primary Examiner* — Bijendra K Shrestha
(74) *Attorney, Agent, or Firm* — Ash Tankha; Lipton, Weinberger & Husick

(57) ABSTRACT

A computer implemented method and system is provided for managing counterparty risks associated with collaterals held by counterparties and minimizing systemic risk. A collateral trust management system (CTMS) is provided. Trust accounts are created for holding assets associated with a fund counterparty or collaterals from a derivative counterparty. A central collateral trust is created for providing funding to the trust accounts for the assets and for exposing the assets in the CTMS. The trust accounts are assigned to the counterparties. Leverage is determined for the trust accounts. Risk of assets in the trust accounts, assets' funding requirements, and amount of collaterals to be posted for external funding provided to the trust accounts are calculated. Collaterals, equity, and/or assets are pooled into the central collateral trust and assets are rehypothecated based on the calculation, for obtaining financing for the trust accounts. The CTMS securitizes risk of default of the trust accounts.

25 Claims, 6 Drawing Sheets

COLLATERAL TRUST MANAGEMENT SYSTEM

CROSS REFERENCE TO RELATED APPLICATIONS

This application claims the benefit of provisional patent application No. 61/163,870 titled "Collateral Trust Management System", filed on Mar. 27, 2009 in the United States Patent And Trademark Office.

The specification of the above referenced patent application is incorporated herein by reference in its entirety.

BACKGROUND

The computer implemented method and system disclosed herein relates, in general, to counterparty risk management in financial markets. More particularly, the computer implemented method and system disclosed herein relates to minimizing systemic risk arising from counterparty risk of financial services firms.

Alternative asset management firms that manage hedge funds, or other firms that manage mutual funds, insurance companies or non-financial corporations herein referred to as fund counterparties, require broker dealer and banking subsidiaries of financial services firms herein referred to as derivative counterparties to provide custodial, lending, and financing services for their financial transactions through prime-brokerage arrangements, repo, stock loan, and similar financing agreements. The derivative counterparties also trade financial derivative products with derivative trading subsidiaries of other derivative counterparties. In addition, derivative counterparties have numerous transactions with one other to manage their investment portfolios. These types of transactions result in risk to counterparties involved in the transactions, and are known as counterparty risk, which is risk of financial loss to a party for a transaction that arises from the default of the counterparty involved in the transaction. In addition, if there is a significant amount of counterparty risk within the financial system, there is an increase in systemic risk. Systemic risk is the risk of contagion of losses within a financial system. In this scenario, systemic risk arises due to a cascading chain of defaults due to the inter-linkages in the financial system. For example, a default of one counterparty results in losses to another counterparty which also defaults and so on and so forth.

The relationship between derivative counterparties and fund counterparties are many to many. For example, fund counterparties may select one or more prime-brokers to custody and finance assets and one or more derivative trading entities to enter into financial derivative transactions with. Similarly, derivative counterparties have one or more prime brokerage operations and one or more derivative trading entities.

This many to many relationship presents several structural disadvantages to the parties involved in a financial transaction. Fund counterparties are exposed to the counterparty risk of the derivative counterparties they transact with. They may not be able to recover their assets or collateral pledged in the event of the bankruptcy of the derivative counterparties and their subsidiaries. The fund counterparties are reliant on financing terms specified by each of the derivative counterparties. The financial terms specified to the fund counterparties are subject to change based on financial market conditions and the fund counterparties have to manage custodial and financing agreements across multiple financial services firms to minimize the risks, resulting in substantially higher operational complexity.

On the other hand, the derivative counterparties see the financing they provide to the fund counterparties as having significant risks relative to the return on investment. The derivative counterparties enter into large sized, low return transactions with fund counterparties thus resulting in high balance sheet usage and high levels of leverage at fund counterparties. Prime brokerage businesses at derivative counterparties re-hypothecate assets custodied at their subsidiaries by the alternative asset management firms as a source of their own financing. If several fund counterparties terminate their business relationship with a particular derivative counterparty in a short time span, that derivative counterparty will face financing crunches and financial instability as the derivative counterparty has to return excess collateral in a short time span, and reduce the balance sheet. The derivative counterparties have an incomplete view of collateral liquidity to a fund, as they can only estimate the risk of the collateral they hold or view and not the collateral held at other financial services firms. This lack of transparency results in an inaccurate view of risk for the financial services firms and contributes to higher than usual systemic risk.

Consider an example of an infrastructure of a financial market comprising alternative asset management firms and financial services firms. An alternative asset manager, for example, of an alternative asset management firm, manages a family of hedge funds, for example, fund 1, fund 2, fund 3, etc. The funds use the money invested with them to buy assets or enter into derivative contracts and generate returns for the investors. Financial services firms, for example, financial services firm "A", financial services firm "B", financial services firm "C", etc. and their prime brokerage entity and derivative counterparty subsidiaries have transactions with fund 1, fund 2, and fund 3 and provide funding to fund 1, fund 2, and fund 3. For example, financial services firm "A" and its prime brokerage entity and derivative counterparty subsidiaries have transactions with fund 1 and provide funding to fund 1. Financial services firm "B" and its prime brokerage has transactions with fund 2 and provides funding to fund 2. Financial services firm "C" and the United States (US) derivative counterparty subsidiaries and European derivative counterparty subsidiaries of financial services firm "C" have transactions with fund 3 and provide funding to fund 3. Financial services firms custody assets and collaterals from funds and provide leverage to them. Investors buying stock in the financial services firms, bond investors, stock investors, counterparty investors, etc. have indirect exposure to counterparty default. Asset backed funding providers in each of the entities provide collateralized lending to, for example, financial services firm "C". Financial regulators collect information from each of the financial services firms, for example, financial services firm "A", financial services firm "B", and financial services firm "C". Each of the funds, fund 1, fund 2 and fund 3, is linked to each subsidiary of each of, for example, the financial services firm A, financial services firm B, and financial services firm "C". Regulatory information on the alternative asset manager collected by the financial regulators is aggregated from financial services firm "A", financial services firm "B", and financial services firm "C". From a regulatory perspective, the current business framework has a higher level of overall systemic risk as regulators do not have an easy way to understand the financial markets and how systemic risk arises. The regulators generally have to gather this information about the many to many relationships from multiple sources and piece together their view of how systemic risk can arise. As a result, instability at a large broker dealer or derivative counterparty has significant systemic impact on the market place and is not easily discernable or preventable in the current framework. An unwind of positions at a financial services firm results in cascading funding crunches, subsequent defaults, and significant market illiquidity.

Hence, there is a long felt but unresolved need for a fiscal and user-friendly computer implemented method and system that manages counterparty risks arising from collaterals posted by both derivative counterparties and fund counterparties with regard to financial transactions they have entered into and minimizing systemic risk across the financial system.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for managing counterparty risks arising from collaterals posted by both derivative counterparties and fund counterparties with regard to financial transactions they have entered into and minimizing systemic risk across the financial system. The fund counterparties are, for example, buy-side firms, subsidiaries of buy-side firms, etc. The derivative counterparties are, for example, sell-side firms, subsidiaries of sell-side firms, etc. The computer implemented method and system disclosed herein determines and holds collateral requirements in a central collateral trust management system independent from financial services firms. By centralizing transactions between counterparties, counterparty risk is handled in the transaction. The counterparties are, for example, fund counterparties, derivative counterparties, subsidiaries of fund counterparties or derivative counterparties, etc. The counterparty risk exposures are consolidated into the centralized collateral trust management system. Counterparty risk is securitized into tranched fixed income securities.

Multiple trust accounts are established for both fund counterparties and derivative counterparties. Leverage levels of the trust accounts of the counterparties are managed in accordance with predefined rules. Counterparty risk guarantees and funding for the trust accounts is provided by selling fixed income securities to investors. The fixed income securities are collateralized by assets in each of the trust accounts. Fund counterparties and derivative counterparties are required to provide additional equity to prevent a default if the fund counterparties and derivative counterparties are beyond the terms of the predefined rules set for their trust accounts. Receiving backstop by global central banks stabilizes the centralized system from abruptly ceasing during a global funding crisis. In case of default by a fund counterparty or a derivative counterparty, the centralized system liquidates assets in trust accounts of the defaulters and distributes realized losses to investors. Stable funding is provided to asset managers by selling tranched fixed income securities to a reliable pool of diversified lenders and investors. Regulatory institutions access data and information and analyze systemic risk in the market place by a centralized process.

In the computer implemented method and system disclosed herein, a collateral trust management system is provided to manage counterparty risks associated with one or more collaterals held by multiple counterparties and to minimize systemic risk. The collateral trust management system functions independently from financial services firms and manages multiple operations related to a business process. The collateral trust management system creates and maintains multiple trust accounts for holding assets associated with each of the fund counterparties or collaterals from each of the derivative counterparties. The collateral trust management system creates and maintains a central collateral trust for providing funding to each of the trust accounts for the assets and for providing counterparty risk guarantees in the collateral trust management system. The collateral trust management system also provides counterparty risk guarantees. The collateral trust management system assigns each of the trust accounts to each of the fund counterparties or each of the derivative counterparties. That is, a trust account is assigned to either a fund counterparty or a derivative counterparty. Each of the trust accounts comprises assets associated with a fund managed by an asset manager or the collaterals associated with the derivative counterparties.

The collateral trust management system determines leverage for each of the trust accounts based on risk based stress tests of portfolios of each of corresponding fund counterparties or each of corresponding derivative counterparties, and types of investment strategies employed by each of the corresponding fund counterparties or each of the corresponding derivative counterparties. The collateral trust management system calculates risk of the assets in the trust accounts, funding requirements for the assets, and amount of each of the collaterals to be posted for external funding provided to each of the trust accounts based on the risk and leverage stress tests of the trust accounts of each of the corresponding fund counterparties or each of the corresponding derivative counterparties and types of investment strategies employed by each of the corresponding fund counterparties or each of the corresponding derivative counterparties. The collateral trust management system provides a graphical user interface that displays at least the determined leverage and the calculated risk of the assets in the trust accounts, the funding requirements for the assets, and the amount of each of the collaterals to be posted for external funding provided for each of the trust accounts to the counterparties.

The collateral trust management system pools collaterals, equity, assets, etc. into the central collateral trust. The assets are rehypothecated based on the calculation for obtaining financing for the trust accounts. The collateral trust management system determines requirement of posting of additional collaterals by the counterparties to the central collateral trust. The collateral trust management system processes posting of the additional collaterals by rehypothecating the assets in the collateral trust management system, or liquidates the assets posted to raise the additional collaterals. The additional collaterals maintain leverage levels for each of the trust accounts to prevent default.

The collateral trust management system manages day to day or daily changes in, for example, contents of the trust accounts, collateral requirements for each of the trust accounts, and funding and derivative counterparty risk for the collateral trust management system via the central collateral trust. The collateral trust management system manages leverage levels of each of the trust accounts in accordance with terms of securities sold to the investors. Either the asset manager liquidates the assets in the trust accounts or provides additional equity or collateral to the collateral trust management system to maintain leverage levels and prevent a default; or the collateral trust management system liquidates the assets in the trust accounts and distributes realized losses to the investors in case of default by the counterparties. The collateral trust management system receives backstop by global central banks for stabilizing the collateral trust management system resulting from an abruptly ceased funding crisis.

The collateral trust management system securitizes risk of default of the trust accounts. Each of the trust accounts pays a predetermined fee to the central collateral trust for protection against default of leverage and counterparty risk. The collateral trust management system provides funding to each of the trust accounts based on risk levels of existing assets in each of the trust accounts based on pre-agreed terms with each of the trust accounts. The collateral trust management system provides counterparty risk guarantees to each of the trust accounts based on a predetermined fee paid by each of the trust accounts to the collateral trust management system. The cost of funding and guarantees to counterparty risk are predetermined by extent of leverage utilized, risk associated with the assets in the trust accounts, and a structuring fee. The funding and the collaterals of each of the trust accounts are jointly managed by the collateral trust management system and either an asset manager or each of the derivative counterparties.

Securitizing the risk of default of one or more of the trust accounts comprises repackaging the risk of default synthetically into multiple fixed income securities, enabling rating of the fixed income securities by fixed income bond rating agencies, and selling the fixed income securities to investors, based on the level of risk associated with the fixed income securities.

The fixed income securities are classified based on individual level of risk. Each of the fixed income securities comprises first risk tranches, mezzanine tranches, junior tranches, and senior tranches. The first risk tranches, mezzanine tranches, and junior tranches are sold to yield seeking investors. The senior tranches are sold to low yield, high stability seeking investors, for example, money market funds. Maturity, rolls, terms, and leverage levels of the assets are standardized. Yields from fixed income securities are based on market pricing. Fees paid to the central collateral trust by the trust accounts are distributed to holders of tranched fixed income securities based on a predetermined formula. The sum of the fees is distributed to investors based on a predetermined formula. The investors are, for example, representatives purchasing securities or representatives providing the funding.

The collateral trust management system coordinates with external brokers or dealers to generate markets for the tranched fixed income securities. The collateral trust management system provides transparency and funding to the generated markets. The collateral trust management system operates as a central counterparty and performs multiple operations. A central server in association with the collateral trust management system maintains a database for providing financial holdings details of each of the trust accounts to each of the counterparties. The central server associated with the collateral trust management system stores and reports, for example, one or more of outstanding size of positions, strategies, risk parameters, collateral requirements, leverage levels, and the financial holdings details associated with the trust accounts to, for example, one or more financial regulators. The collateral trust management system is backstopped by global central banks to prevent systemic risk resulting from abrupt absence of refinancing by an investor crisis. The collateral trust management system provides information to financial regulators aid them in managing the systemic risk and understanding impact of the systemic risk. The collateral trust management system therefore manages counterparty risk associated with the collaterals held by the counterparties and minimizes systemic risk.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
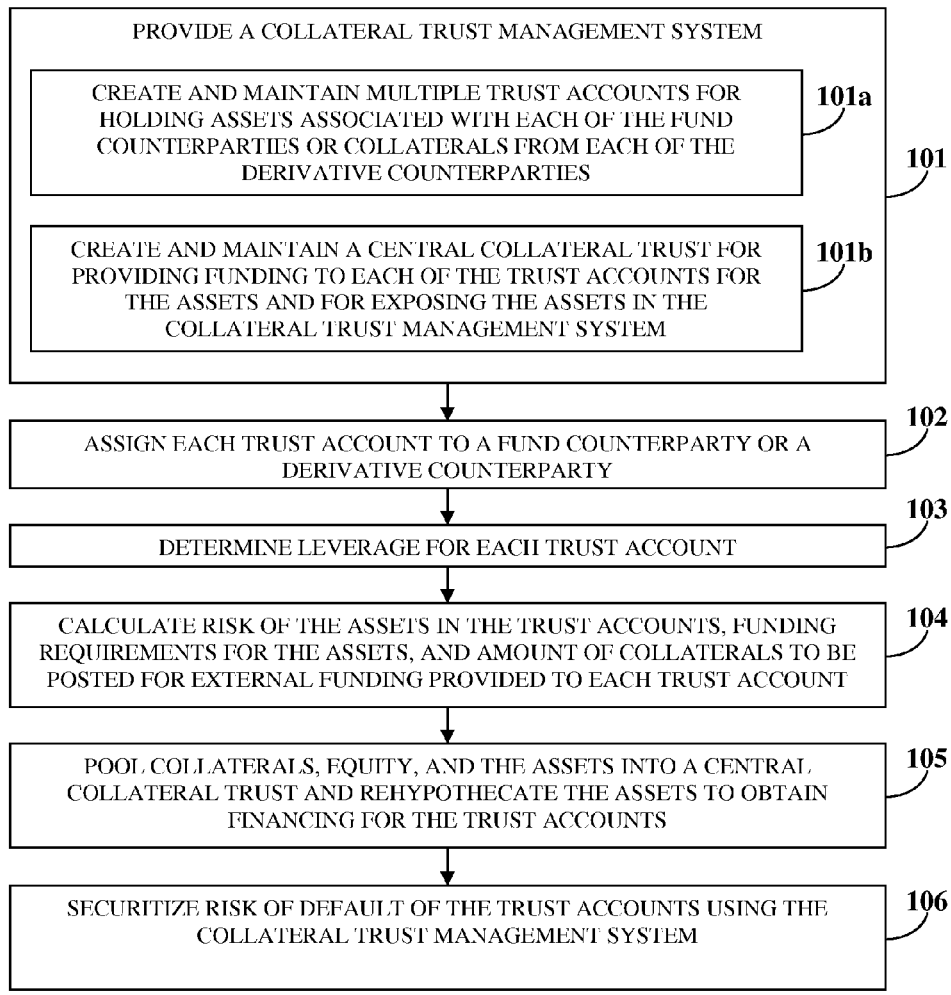
FIG. 1 illustrates a computer implemented method for managing counterparty risks associated with one or more collaterals held by multiple counterparties and minimizing systemic risk.

FIG. 1 illustrates a computer implemented method for managing counterparty risks associated with one or more collaterals held by multiple counterparties and minimizing systemic risk. As used herein, the term "counterparty" refers to firms, for example, a hedge fund, managed by an alternative asset management firm, a derivative subsidiary of a financial services firm, an entity that enters into a financial transaction with a derivative counterparty and fund counterparty, financial services firms, etc. The fund counterparty is, for example, a buy-side firm, a subsidiary of a buy-side firm, etc. The derivative counterparty is, for example, a derivative trading entity, or prime-brokerage subsidiary of a sell-side firm, etc. The systemic risk is a risk of contagion of losses within a financial system, for example, systemic counterparty risk arising due to a cascading chain of defaults of counterparties, when one or more counterparties default, due to inter linkages among the counterparties, a second of the counterparties incurs loss causing its default and so on and so forth in the financial system, etc. A collateral trust management system (CTMS) is provided 101 to manage counterparty risks associated with one or more collaterals held by multiple counterparties and minimize systemic risk.

The collateral trust management system functions independently from financial services firms and manages multiple operations related to a business process. The operations related to the business process managed by the collateral trust management system are, for example, collateral management, clearing, funding, services typically provided by a prime brokerage entity of a sell-side firm, etc. The collateral trust management system creates and maintains 101a multiple trust accounts for holding assets associated with each of one or more fund counterparties or collaterals from each of one or more derivative counterparties. The trust accounts hold, for example, assets such as securities, or derivative products, cash deposited by the fund counterparties or the derivative counterparties, etc. The collateral trust management system creates and maintains 101b a central collateral trust for providing funding to each of the trust accounts for the assets and for exposing the assets in the collateral trust management system. The collateral trust management system assigns 102 each of the trust accounts to each of the fund counterparties or each of the derivative counterparties. That is, a trust account is assigned to either a fund counterparty or a derivative counterparty. Each of the trust accounts comprises assets associated with a fund managed by an asset manager or the collaterals associated with the derivative counterparties. The central collateral trust provides funds to the trust accounts.

When a transaction is initiated between the fund counterparty and derivative counterparty, the two entities are responsible to each other for the economics of the transaction. However, in case either of the two counterparties commits a default, for example, goes bankrupt or cannot fulfill their responsibilities, etc. the collateral trust management system guarantees the payment and makes the counterparty whole as per standard unwind provisions of the transaction. The defaulter counterparty enables the liquidation of securities and repayment of funding. A profitable amount received during the liquidation of securities results in payment of entire funding to the central collateral trust and investors in the fixed income securities remain unaffected. A shortfall in recovered funding on liquidation of securities reduces the principal on the counterparty risk fixed income securities to level up the difference, based on, for example, the level of guarantee, etc. The collateral trust management system makes the central collateral trust whole.

Leverage for each of the trust accounts is determined 103 based on risk based stress tests of portfolios of each of corresponding fund counterparties or each of corresponding derivative counterparties, and types of investment strategies employed by each of the corresponding fund counterparties or each of the corresponding derivative counterparties. Consider an example where, a portfolio with funding requirements of $300 million based on actual assets bought and sold and the collateral requirement of $75 million based on a risk based stress test implies, the leverage is $300 million divided by $75 million and is equal to four times the leverage. If the trust account has $100 million of equity, then the trust account has $25 million of excess collateral to be used for an additional position increase to use the entire $100 million of funding. The risk based stress test, for example, for a long short equity portfolio could be equal to 30% of net long+15% of gross portfolio size or alternatively ten times the one day value at risk measure for the portfolio. The risk based stress tests are adjusted for the liquidity of the assets in the portfolio by extending the multiples to be proportionate to the time period of liquidation. The collateral trust management system calculates 104 risk of the assets in the trust accounts, funding requirements for the assets, and amount of each of the collaterals to be posted for external funding provided to each of the trust accounts. The collateral trust management system performs the calculation based on the risk and leverage stress tests of the trust accounts of each of the corresponding fund counterparties or each of the corresponding derivative counterparties and types of investment strategies employed by each of the corresponding fund counterparties or each of the corresponding derivative counterparties.

The collateral trust management system pools 105 the collaterals, equity, and assets across trust accounts of multiple counterparties into the central collateral trust and rehypothecates the assets based on the calculation to obtain financing for the trust accounts, for example, by posting the securities to an external bank, etc. in exchange for funds, or securitizing by issuing bonds collateralized by the securities. The received funds are used to fund the trust accounts of the counterparty. As used herein, the term "financing" relates to, for example, funding and related cash management and liquidity provision for the trust accounts. The collateral trust management system determines requirement of posting of additional collaterals by the counterparties to the central collateral trust. The collateral trust management system processes posting of the additional collaterals by rehypothecating the assets in the collateral trust management system, or liquidates the assets posted to raise the additional collaterals. The additional collaterals maintain leverage levels for each of the trust accounts to prevent default. The collateral trust management system manages day to day or daily changes in, for example, contents of the trust accounts, collateral requirements for each of the trust accounts, funding and derivative counterparty risk for the collateral trust management system via the central collateral trust. The collateral trust management system manages the daily changes based on, for example, new transactions, market moves, updated determination of collateral requirements, and issuance of counterparty risk bonds or their funding equivalent.

The collateral trust management system manages leverage levels of each of the trust accounts in accordance with terms of securities sold to the investors. Either the asset manager liquidates the assets in the trust accounts or the trust accounts provide additional equity to the collateral trust management system to maintain leverage levels and prevent a default. The collateral trust management system receives backstop by global central banks for stabilizing the collateral trust management system resulting from an abruptly ceased funding crisis. The collateral trust management system liquidates the assets in the trust accounts and distributes realized losses to investors in case of default by the counterparties. The defaulting counterparties are, for example, counterparties unable to make whole on financial obligations, etc. Losses are distributed based on a predetermined algorithm, for example, based on the waterfall structure of losses securitized in the fixed income securities, etc. issued by the collateral trust management system. The fixed income securities are, for example, bonds, etc.

The collateral trust management system securitizes 106 risk of default of the trust accounts. Each of the trust accounts pays a predetermined fee to the central collateral trust for protection against default of leverage and counterparty risk. The collateral trust management system manages counterparty risk associated with the collaterals held by the counterparties and minimizes systemic risk. The collateral trust management system provides funding to each of the trust accounts based on risk levels of existing assets in each of the trust accounts according to pre-agreed terms with each of the trust accounts, for example, for calculating leverage, current borrowings, equity of the counterparty, risk of the trust account based on the investment strategy and assets held in the trust accounts, etc. The collateral trust management system then compares these calculated numbers to preset ratios and levels of risk, borrowings, and leverage predetermined for the trust account based on agreed upon terms with the counterparties. A counterparty having excess capacity based on the preset levels and current usage of different metrics is allowed to increase its risk exposure to the preset levels by buying securities and entering into derivative transactions and receives additional funding on request by the counterparty. A counterparty having deficit capacity based on the preset levels and current usage of different metrics has to reduce its exposure by selling securities and unwinding derivative transactions, with reduction in funding.

The collateral trust management system provides funding to the accounts on a fully collateralized basis. The collateral trust management system transfers assets from the counterparty's trust account to the central collateral trust and provides funds based on agreed upon rules. The securities are returned to the counterparty's trust account when the funds are repaid to the central collateral trust. The collateral trust management system provides counterparty risk guarantees to each of the trust accounts based on predetermined fees paid by each of the trust accounts to the collateral trust management system. The cost of funding and guarantee to counterparty risk are predetermined by extent of leverage utilized, risk associated with assets in the trust account, and a structuring fee. The funding and the collaterals of each of the trust accounts are jointly managed by the collateral trust management system and either an asset manager or each of the derivative counterparties.

Securitizing the risk of default of one or more of the trust accounts comprises repackaging the risk of default synthetically into multiple fixed income securities, enabling rating of the fixed income securities by fixed income bond rating agencies, and selling the fixed income securities to investors, based on the level of risk associated with the fixed income securities. The rating agencies are, for example, Moody's Investors Service, Standard & Poor's (S&P), etc. The investors are, for example, representatives that purchase the fixed income securities or funding providers that provide funds, etc. The fixed income securities are classified based on individual level of risk. Each of the fixed income securities comprises, for example, first risk tranches, mezzanine tranches, junior tranches, and senior tranches. The first risk tranches, the mezzanine tranches, and the junior tranches are sold to yield seeking investors. The senior tranches are sold to low yield, high stability seeking investors, for example, money market funds. Maturity, rolls, terms, and leverage levels of the assets are standardized, and yields from the fixed income securities are based on market pricing.

The fees paid by each of the trust accounts to the central collateral trust for protection against default of leverage and counterparty risk, are distributed to holders of tranched fixed income securities based on a predetermined formula. The sum of the fees is distributed to investors, for example, representatives purchasing securities or representatives providing the funding, etc. based on a predetermined formula. As an example, $100 million of counterparty bonds are issued and $5 million is collected as fees from investors, $1 million goes to the equity, first risk tranches, junior tranches and mezzanine tranches each of which are of size, $5 million, $10 million and $20 million respectively for yields of 20%, 10% and 5% respectively. The remaining $2 million will go to the senior tranches investors of size $65 million or a yield of approximately 3%.

The central collateral trust satisfies its obligation towards the counterparties by selling counterparty risk bonds to providers of counterparty risk guarantees. The investors in the fixed income securities receive a market rate coupon based on the level of counterparty risk guarantees they provide. The investors are, for example, pension funds, insurance companies, etc. In return, loss of the collateralized assets reflects in the principal of the issued fixed income securities being reduced by the amount of the loss. The fixed income securities guarantee complete counterparty risk of the pool, for example, a normal bond, etc. and a part of the counterparty risk. The counterparty risk is guaranteed in part by determining splitting up of the counterparty risk, with the first of the defaults being guaranteed by the riskiest bonds receiving the highest coupons and the furthest defaults guaranteed by the least risky bonds receiving the least coupons. The aggregate pricing is set by the issuers and investors of the bonds based on market conditions. As an example, a single investor or financial institution could guarantee all the counterparty risk of the fixed income securities in a single central collateral trust or alternatively the different tranches could be sold to multiple investors each of whom would guarantee a part of the overall counterparty risk. The financial system may comprise a single large collateral trust management system or a multitude of independently managed collateral trust management systems.

The collateral trust management system operates as a central counterparty and performs multiple operations, for example, collateral management, clearing, funding, etc. The collateral trust management system coordinates with external brokers or dealers to generate markets for the tranched fixed income securities. The fixed income securities are sold periodically, for example, weekly, with periodic resets in rates, with longer maturities, etc. thereby guaranteeing funding for a definite term, and the return of the fixed income securities varies with change in market conditions. The funding is, for example, relatively stable and unaffected by the financial situations of a single lender or investor. The collateral trust management system provides transparency and funding to the markets. The collateral trust management system is backstopped by global central banks to prevent systemic risk resulting from abrupt absence of refinancing by investor crisis.

A central server associated with the collateral trust management system maintains a database for providing financial holdings details of each of the trust accounts to each of the counterparties. The central server stores and reports one or more of, for example, outstanding size of positions, strategies, risk parameters, collateral requirements, leverage levels, and the financial holdings details associated with the trust accounts to the collateral trust management system and/or one or more financial regulators. Information on, for example, the outstanding size of positions, strategies, risk parameters, collateral requirements, leverage levels, and the financial holdings details associated with each of the trust accounts are updated electronically in preset time intervals onto the central server connected to the collateral trust management system via a network. The collateral trust management system generates reports based on the information for access by financial regulators. The collateral trust management system embodies a process for the financial regulators to gather information in the form of the generated reports from the collateral trust management system, and manage a reduced amount of systemic risk and understand impact of the systemic risk arising from counterparty risk exposure in the market place.

The collateral trust management system operates as a central counterparty and performs multiple operations, for example, collateral management, clearing, funding, services typically provided by a prime brokerage entity of a sell-side firm, etc., generation of reports, management of settings to set timers for electronic updates, etc. related to the business process of the collateral trust management system. The collateral trust management system displays the generated reports to the counterparties via a graphical user interface (GUI). The GUI also displays, for example, the determined leverage and the calculated risk of the assets in the trust accounts, the funding requirements for the assets, and the amount of each of the collaterals to be posted for external funding provided for each of the trust accounts, to the counterparties. The GUI enables the counterparties to upload their portfolios and enter information on types of investment strategies employed by each of the corresponding fund counterparties and/or each of the corresponding derivative counterparties.

In an example, a counterparty interacts with the collateral trust management system via the GUI of the collateral trust management system, for example, to post additional collaterals to maintain leverage levels of the trust accounts. The counterparties carry out a combination of interactions with the collateral trust management system, for example, by logging in to the collateral trust management system using a given login identifier and password via the GUI. The counterparties may then enter input, pass queries, send requests for information, for example, in the form of reports/graphs, etc. via the GUI. The collateral trust management system can thereby generate customized reports of, for example, outstanding size of positions, strategies, risk parameters, collateral requirements, leverage levels, the financial holdings details associated with the counterparty's trust accounts, etc. based on the preferences of the counterparties.

In another example, a financial regulator such as a representative monitoring financial regulations in a worldwide market place, etc. interacts with the collateral trust management system to access data and gather information pertaining to the counterparties that are operational at the market place, in the form of, for example, generated reports/charts, drawings, etc. from the collateral trust management system. The financial regulator can log into the collateral trust management system using a given login identifier and password and then enter input, pass queries, send requests for reports/graphs, etc. via the GUI of the collateral trust management system. The financial regulator can therefore manage a reduced amount of systemic risk and understand the impact of the systemic risk arising from the counterparty risk exposure in the market place using the collateral trust management system.

Figure 2:
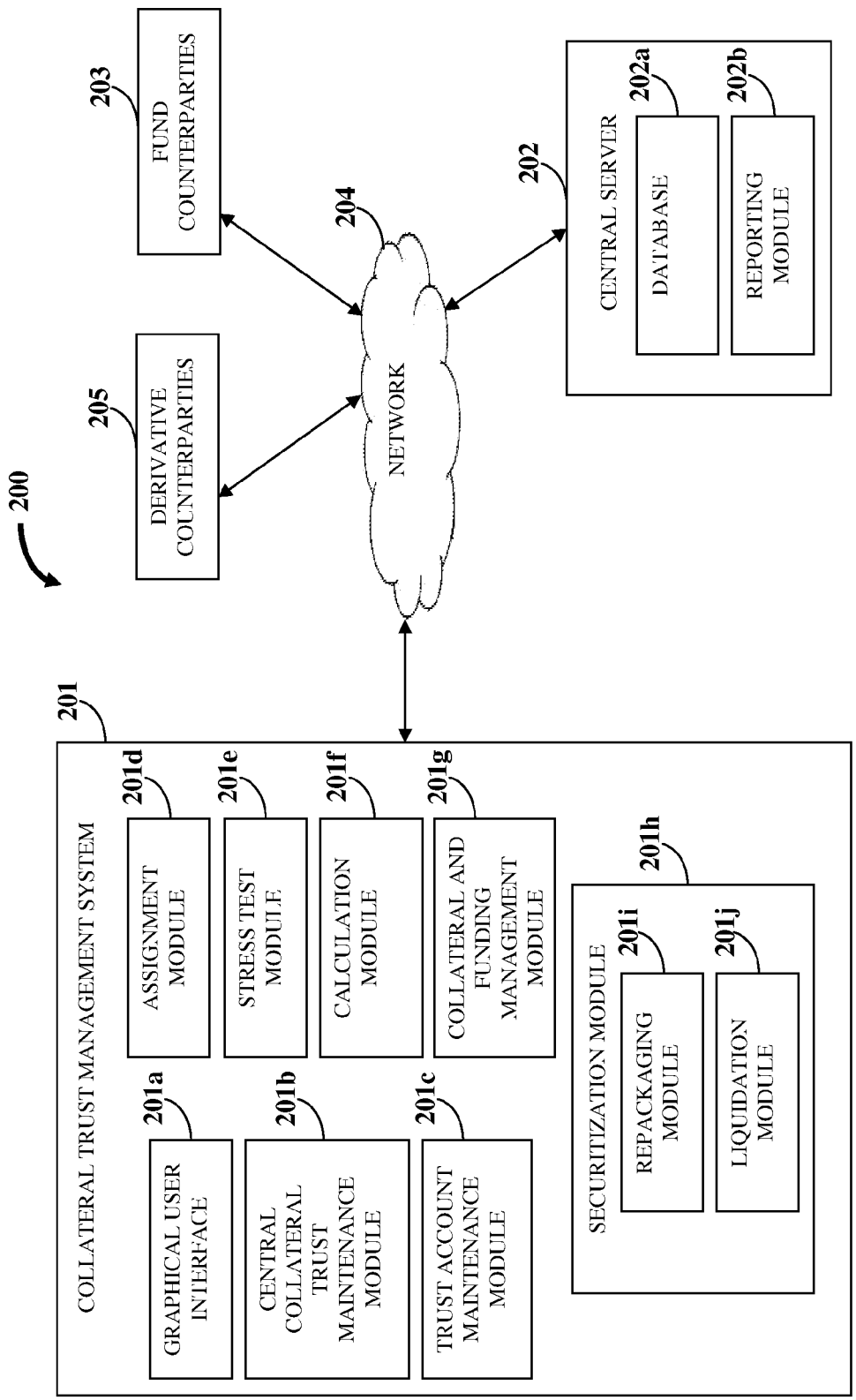
FIG. 2 illustrates a computer implemented system for managing counterparty risks associated with one or more collaterals held by multiple counterparties and minimizing systemic risk.

FIG. 2 illustrates a computer implemented system 200 for managing counterparty risks associated with one or more collaterals held by multiple counterparties 203 and 205 and minimizing systemic risk. The computer implemented system 200 disclosed herein comprises a collateral trust management system 201 interacting with a central server 202 and counterparties 203 and 205 via a network 204. The network 204 is, for example, a wireless communication network, a mobile communication network, a local area communication network, an internet connection network, etc. The collateral trust management system 201 functions independently from financial services firms and manages multiple operations related to business process. The collateral trust management system 201 comprises a trust account maintenance module 201c, a central collateral trust maintenance module 201b, an assignment module 201d, a stress test module 201e, a calculation module 201f, a securitization module 201h, a collateral and funding management module 201g, and a graphical user interface (GUI) 201a. The trust account maintenance module 201c creates and maintains multiple trust accounts. Each of the created trust accounts holds assets associated with the fund managed by an asset manager associated with a fund counterparty 203 or collaterals associated with a derivative counterparty 205.

The central collateral trust maintenance module 201b creates and maintains a central collateral trust for providing funding to each of the trust accounts for the assets and for exposing the assets managed by the collateral trust management system 201. The central collateral trust maintenance module 201b obtains financing for the trust accounts by pooling collaterals, equity, and the assets from each of the counterparties 203 or 205 into the central collateral trust, and/or by rehypothecating assets contained in the trust accounts. The assets are rehypothecated, for example, with a secured lender. The assignment module 201d assigns each of the trust accounts to a fund counterparty 203 or a derivative counterparty 205. Each of the trust accounts comprises assets associated with a fund managed by an asset manager of each of the fund counterparties 203 or collaterals associated with the derivative counterparties 205.

The collateral trust management system 201 utilizes the trust account maintenance module 201c and the central collateral trust maintenance module 201b to provide funding to each of the trust accounts based on risk levels of the assets in the each of the trust accounts according to pre-agreed terms with the each of the trust accounts. The collateral trust management system 201 also utilizes the trust account maintenance module 201c and the central collateral trust maintenance module 201b to provide counterparty risk guarantees to each of the trust accounts based on the predetermined fee paid by the each of the trust accounts to the collateral trust management system 201.

The stress test module 201e determines leverage for each of the trust accounts based on risk based stress tests of portfolios of one of each of corresponding fund counterparties 203 or each of corresponding derivative counterparties 205, and types of investment strategies employed by each of the corresponding fund counterparties 203 or each of the corresponding derivative counterparties 205.

The calculation module 201f calculates, for example, risk of the assets in the trust accounts, funding requirements for the assets, amount of collateral to be posted for external funding provided to each of the trust accounts, etc. based on, for example, the risk and leverage stress tests of the trust accounts of each of corresponding fund counterparties 203 or each of corresponding derivative counterparties 205, and types of investment strategies employed by each of the corresponding fund counterparties 203 or each of the corresponding derivative counterparties 205, etc. Funding is provided by the collateral trust management system 201 to the trust accounts based on the risk levels of the existing assets in the trust accounts by agreeing upon terms with the counterparties 203 and 205.

The securitization module 201h securitizes risk of default of the trust accounts. Each of the trust accounts pays a predetermined fee to the central collateral trust for the leverage and protection against the risk of default. The securitization module 201h comprises a repackaging module 201i and a liquidation module 201j. The repackaging module 201i synthetically repackages the risk of default into, for example, multiple fixed income securities, enables rating of the fixed income securities by fixed income bond rating agencies, and sells the fixed income securities to investors, based on the level of risk associated with the fixed income securities. The fixed income securities are classified based on individual level of risk. The liquidation module 201j liquidates the portfolios of each of corresponding fund counterparties 203 or each of corresponding derivative counterparties 205 and distributes realized losses to investors in case of default.

The collateral and funding management module 201g manages day to day changes, for example, in the contents of the trust accounts, collateral requirements for each of the trust accounts, funding and counterparty risk for the collateral trust management system 201, etc. The collateral and funding management module 201g determines requirement of posting of additional collaterals to the central collateral trust by the counterparties 203 and 205 to maintain the leverage levels of each of the trust accounts and prevent default of the trust accounts. The collateral and funding management module 201g either processes posting of the additional collaterals by rehypothecating the assets in the collateral trust management system 201 or liquidates the assets posted to raise the additional collaterals using the liquidation module 201j, on requiring the posting of the additional collaterals to the central collateral trust. The posted additional collaterals maintain leverage levels for each of the trust accounts to prevent default.

The GUI 201a displays, for example, the determined leverage and the calculated risk of the assets in the trust accounts, the funding requirements for the assets, and the amount of each of the collaterals to be posted for external funding provided for each of the trust accounts. The GUI 201a of the collateral trust management system 201 enables the counterparties 203 and 205 to interact with the collateral trust management system 201.

The GUI 201a displays reports generated by the collateral trust management system 201 based on multiple operations, for example, collateral management, clearing, funding, services typically provided by a prime brokerage entity of a sell-side firm, etc. carried out by the collateral trust management system 201. The GUI 201a enables financial regulators, for example, an user representative monitoring financial regulations in a worldwide market place, etc. to gather information pertaining to counterparties 203 and 205 that are operational at the market place, in the form of the generated reports from the collateral trust management system 201, to manage a reduced amount of systemic risk and understand impact of the systemic risk arising from the counterparty risk exposure in the market place.

The central server 202 associated with the collateral trust management system 201 via the network 204 comprises a database 202a and a reporting module 202b. The database 202a stores, for example, outstanding size of positions, strategies, risk parameters, collateral requirements, leverage levels, financial holdings details associated with each of the trust accounts, etc. The reporting module 202b reports, for example, the outstanding size of positions, strategies, risk parameters, collateral requirements, leverage levels, financial holdings details associated with each of the trust accounts, for example, to financial regulators, counterparties 203 and 205, etc. In an embodiment, the collateral trust management system 201 retrieves the generated reports from the central server 202 via the network 204 and displays the generated reports to, for example, financial regulators, counterparties 203 and 205, etc. via the network 204.

Figure 3:
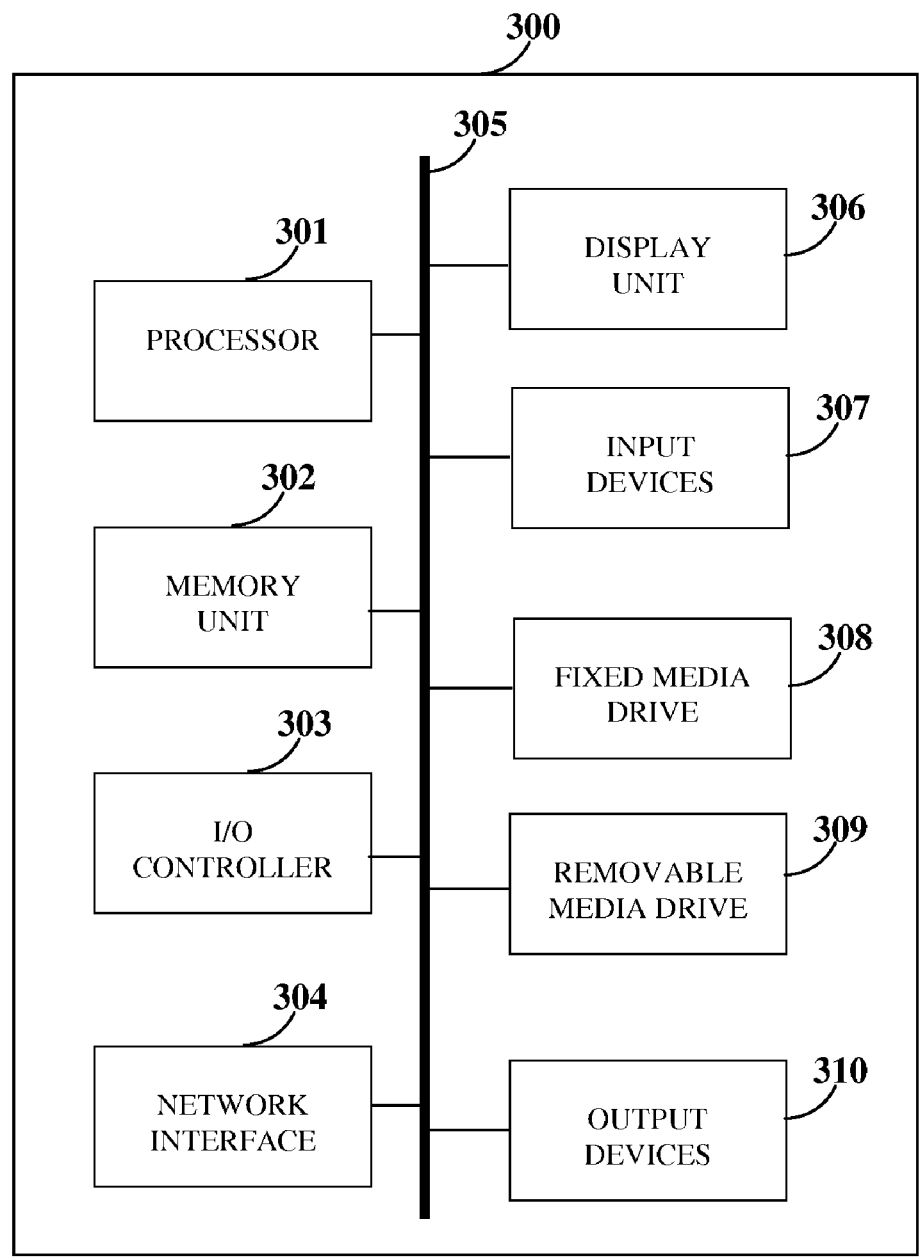
FIG. 3 exemplarily illustrates a computer system employed in a collateral trust management system for managing counterparty risks associated with one or more collaterals held by multiple counterparties and minimizing systemic risk.

FIG. 3 exemplarily illustrates a computer system 300 employed in, for example, the collateral trust management system 201 and the central server 202 for managing counterparty risks associated with one or more collaterals held by multiple counterparties 203 and 205 and minimizing systemic risk. Each of the collateral trust management system 201 and the central server 202 is deployed on, for example, the computer system 300 exemplarily illustrated in FIG. 3.

The collateral trust management system 201 and the central server 202 communicate with each other via the network 204, for example, internet. The computer system 300 comprises, for example, a processor 301, a memory unit 302 for storing programs and data, an input/output (I/O) controller 303, a network interface 304, a network bus 305, a display unit 306, input devices 307, a fixed media drive 308, a removable media drive 309, output devices 310, etc.

The processor 301 is an electronic circuit that executes computer programs. The memory unit 302 is used for storing computer programs and applications. A client application or application software used to implement the steps of the computer implemented method disclosed herein is, for example, stored on the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to the network 204. The I/O controller 303 controls the input and output actions performed by, for example, the counterparties 203 and 205. The network bus 305 permits communication between the modules, for example, 201b, 201c, 201d, 201e, 201f, 201g, 201h, 201i, and 201j of the collateral trust management system 201. The network bus 305 further permits communication between the modules, for example, 202a and 202b of the central server 202.

The display unit 306 displays computed results, for example, the outstanding size of positions, strategies, risk parameters, collateral requirements, leverage levels, financial holdings details associated with each of the trust accounts, etc. on the GUI 201a provided by the collateral trust management system 201. The input devices 307 are used for inputting data into the computer system 300. The input devices 307 are, for example, a keyboard such as an alphanumeric keyboard, a joystick, a mouse, a touch pad, a light pen, etc. The computer system 300 further comprises a fixed media drive 308 and a removable media drive 309 for receiving removable media. The display unit 306 enables the counterparties 203 and 205 to interact with the collateral trust management system 201 via the GUI 201a.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly through the network 204. Computer applications and programs are executed by double clicking a related icon displayed on the display unit 306 using one of the input devices 307.

The computer system 300 of the collateral trust management system 201 and the central server 202 employs operating systems for performing multiple tasks. An operating system is responsible for the management and coordination of activities and the sharing of the resources of the computer system 300. The operating system further manages security of the computer system 300, peripheral devices connected to the computer system 300, and network connections. The operating system employed on the computer system 300 recognizes, for example, inputs provided by the counterparties 203 and 205 using one of the input devices 307, the output display, files and directories stored locally on the fixed media drive 308, etc. The operating system on the computer system 300 of the collateral trust management system 201 executes different programs initiated by the counterparties 203 and 205, the collateral trust management system 201, or the central server 202 using the processor 301. Instructions for executing the collateral trust management system 201 are retrieved by the processor 301 from the program memory in the form of signals. The location of the instructions in the program memory is determined by a program counter (PC). The program counter stores a number that identifies the current position in the program implemented by the collateral trust management system 201 and the central server 202.

The instructions fetched by the processor 301 from the program memory after being processed are decoded. After processing and decoding, the processor 301 executes the instructions. For example, the trust account maintenance module 201c defines instructions for creating and maintaining multiple trust accounts that hold assets associated with each of the fund counterparties 203 and/or collaterals from each of the derivative counterparties 205. The central collateral trust maintenance module 201b defines instructions for creating and maintaining a central collateral trust that provides funding to each of the trust accounts for the assets and for exposing the assets managed by the collateral trust management system 201. The assignment module 201d defines instructions for assigning each of the trust accounts to each of the fund counterparties 203 or each of the derivative counterparties 205. The stress test module 201e defines instructions for determining leverage for each of the trust accounts based on risk based stress tests of portfolios of each of the corresponding funds or each of the corresponding derivative counterparties 205, and types of strategies employed by each of the corresponding funds or each of the corresponding derivative counterparties 205. The calculation module 201f defines instructions for calculating one or more of risk of the assets in the trust accounts, funding requirements for the assets, and amount of collateral to be posted for external funding provided to each of the trust accounts.

The collateral and funding management module 201g defines instructions for managing day to day changes in one or more of contents of the trust accounts, collateral requirements for each of the trust accounts, and funding and counterparty risk for the collateral trust management system 201. The securitization module 201h defines instructions for securitizing risk of default of one or more trust accounts. The repackaging module 201i defines instructions for synthetically repackaging the risk of default into multiple fixed income securities. The liquidation module 201j defines instructions for liquidating the portfolios of each of the corresponding fund counterparties 203 and/or each of the corresponding derivative counterparties 205 and for distributing any realized losses to investors in case of default. The collateral and funding management module 201g also defines instructions for determining whether additional collateral needs to be posted to the central collateral trust by the counterparties 203 and 205 to maintain the leverage levels of each of the trust accounts and prevent default of the trust accounts. The reporting module 202b defines instructions for generating periodic reports on the information stored for assessment by the financial regulators. The defined instructions are stored in the program memory or received from a remote server.

The processor 301 of the collateral trust management system 201 retrieves the instructions defined by the trust account maintenance module 201c, the central collateral trust maintenance module 201b, the assignment module 201d, the stress test module 201e, the calculation module 201f, the securitization module 201h, the repackaging module 201i, the liquidation module 201j, and the collateral and funding management module 201g and executes the instructions. Furthermore, the processor 301 on the central server 202 retrieves the instructions defined by the reporting module 202b and executes the instructions.

Figure 4:
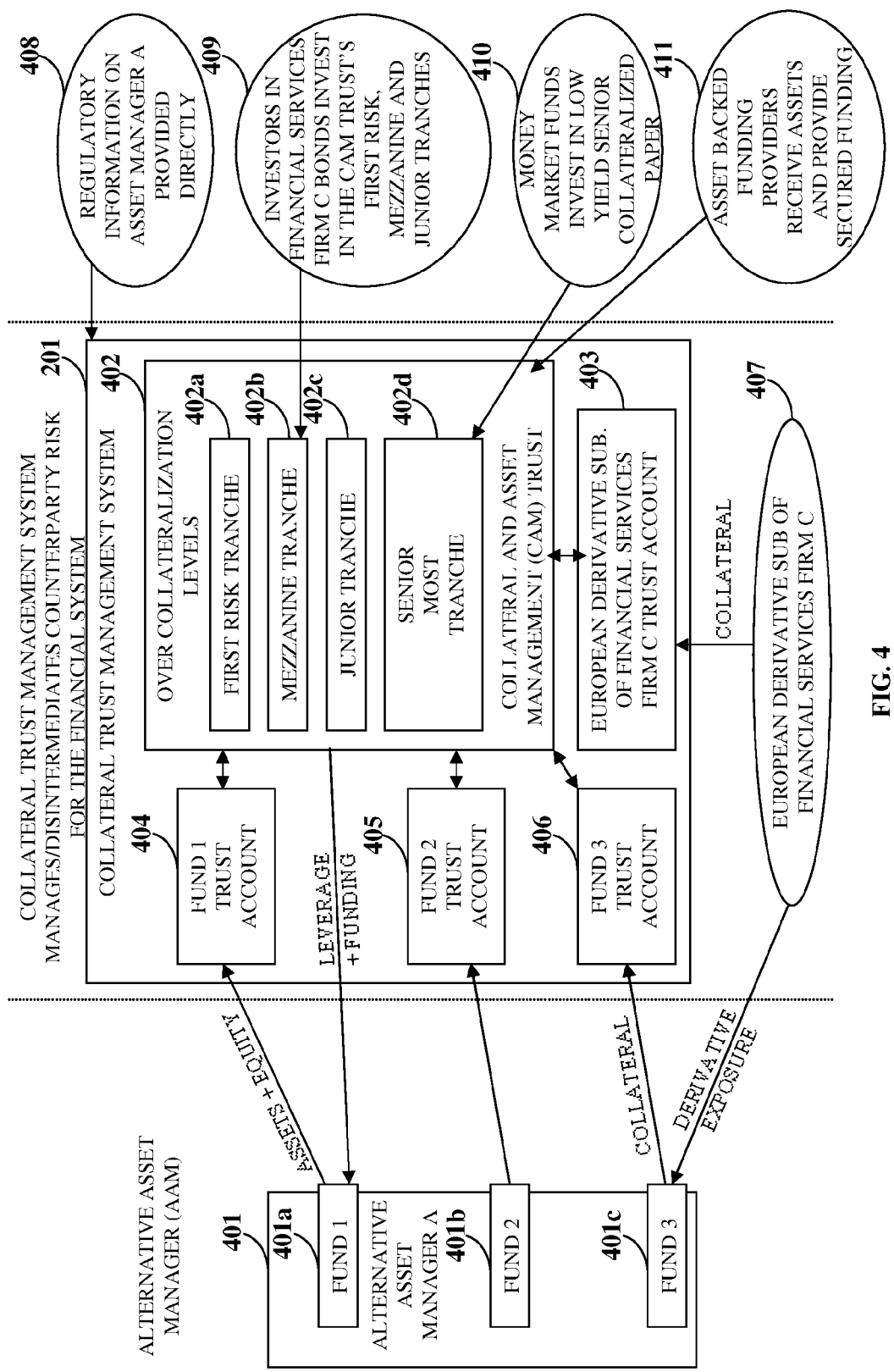
FIG. 4 exemplarily illustrates a collateral trust management system for managing counterparty risks associated with collaterals held by multiple counterparties and minimizing systemic risk.

FIG. 4 exemplarily illustrates a collateral trust management system 201 for managing counterparty risks associated with collaterals held by multiple counterparties 203 and 205 and minimizing systemic risk. The collateral trust management system 201 comprising a central collateral trust, for example, a collateral and asset management (CAM) trust 402 and multiple trust accounts, for example, fund 1 trust account 404, fund 2 trust account 405, fund 3 trust account 406, etc. are set up. An alternative asset manager "A" 401 of a counterparty 203, for example, an alternative asset management firm, manages a family of funds or fund counterparties 203, for example, fund 1 401a, fund 2 401b, and fund 3 401c. The trust accounts, for example, the fund 1 trust account 404, the fund 2 trust account 405, and the fund 3 trust account 406, are assigned to each of the funds, fund 1 401a, fund 2 401b, and fund 3 401c respectively, and are managed by the collateral trust management system 201. The assets and equity owned by fund 1 401a are held in the fund 1 trust account 404 assigned to fund 1 401a. Similarly, the assets and equity owned by fund 2 401b are held in the fund 2 trust account 405 assigned to fund 2 401b, and fund 3 401c deposits collateral in the fund 3 trust account 406 assigned to fund 3 401c. Fund 3 401c faces derivative exposure from a derivative counterparty 205, for example, the European derivative subsidiary (SUB) of a financial services firm C 407. The European derivative subsidiary of financial services firm C 407 is assigned a trust account 403, for example, a European derivative SUB of financial services firm C trust account 403, in the collateral trust management system 201 and deposits the collateral held by the European derivative subsidiary of financial services firm C 407 in the trust account 403. All over-the-counter transactions and listed derivative transactions face the CAM trust 402 for counterparty risk, and collaterals provided by one or more investors and one or more counterparties 203 or 205 are pooled into the CAM trust 402, acting as the central counterparty for all transactions. Each of the trust accounts is provided with leverage capacity through the funds using, for example, risk based "haircuts" or stress test based collateral for the assets, etc. The cost of financing is predetermined by the extent of leverage utilized and a structuring fee.

The collateral trust management system 201 securitizes the risk of default of any of the trust accounts assigned to the family of funds, for example, fund 1 401a, fund 2 401b and fund 3 401c, managed by the alternative asset manager "A" 401 of a fund counterparty 203, and the European derivative subsidiary of financial services firm C 407. The counterparty risk exposure is pooled into the CAM trust 402. The counterparty risk in the CAM trust 402 is securitized into fixed income securities collateralized by assets in the CAM trust 402 and rated by fixed income bond rating agencies, based on the over-collateralization levels and sold as risk tranches to different types of fixed income investors. Investors in financial services firm C bonds instead invest 409 in fixed income securities collateralized with the CAM trust's 402 first risk tranches 402a, mezzanine tranches 402b and junior tranches 402c. Money market funds invest 410 in low yielding senior most tranches 402d, for example, senior tranche collateralized paper. The asset backed funding providers receive assets and provide secured funding 411 to the CAM trust 402. The maturity, rolls, terms, and leverage levels of the assets are standardized while the yields of the bonds are based on market pricing. The trust accounts pay a fee for the services of leverage and counterparty risk protection that are provided by the CAM trust 402. The fees paid by the trust accounts are distributed to the tranched bond holders in a predetermined formula. The regulatory information on the alternative asset manager "A" 401 is directly provided 408 to financial regulators. Financial regulators source information about systemic risk and manage all issues through the CAM trust 402 and the collateral trust management system 201. Thus, the collateral trust management system 201 disintermediates the counterparty risk from the financial system.

Additional financing for the trust accounts is raised by rehypothecating assets in the CAM trust 402. The collateral trust management system 201 coordinates with external brokers or dealers to make markets in the tranched fixed income securities and provide transparency and financing to the markets. The collateral trust management system 201 determines if additional collateral needs to be posted to the central collateral trust by the counterparties 203 and 205. If additional collateral needs to be posted, the collateral trust management system 201 processes the posting of the collateral or liquidates assets in the trust accounts or provides additional equity to raise the additional collateral for maintaining leverage levels for each of the trust accounts to prevent default. In case of default of one of the trust accounts, the collateral trust management system 201 liquidates the portfolios of the corresponding fund managed by the asset manager and distributes the realized losses to the investors.

Furthermore, the collateral trust management system 201 maintains a database 202*a* on the central server 202, to provide centralized and standardized marking of all positions to all the trust accounts and the counterparties 203 and 205. Financial regulators assess the impact of systemic risk in the alternative asset management business, by having a central place of information and management of systemic risk without going to multiple providers having nonstandard methods of providing the data. The CAM trust 402 provides the financial regulators with information about outstanding size of positions, strategies and leverage levels, financing constraints in the marketplace, issues related to systemic risk regulation such as centralized marking standards, collateral standards and product innovation, and levels of counterparty risk and their owners as well as results of scenarios if individual trust accounts or financial services firms default. Such an arrangement enables the financial regulators to decouple market risk from counterparty risk and minimize systemic risk due to counterparty risk.

Figure 5A:
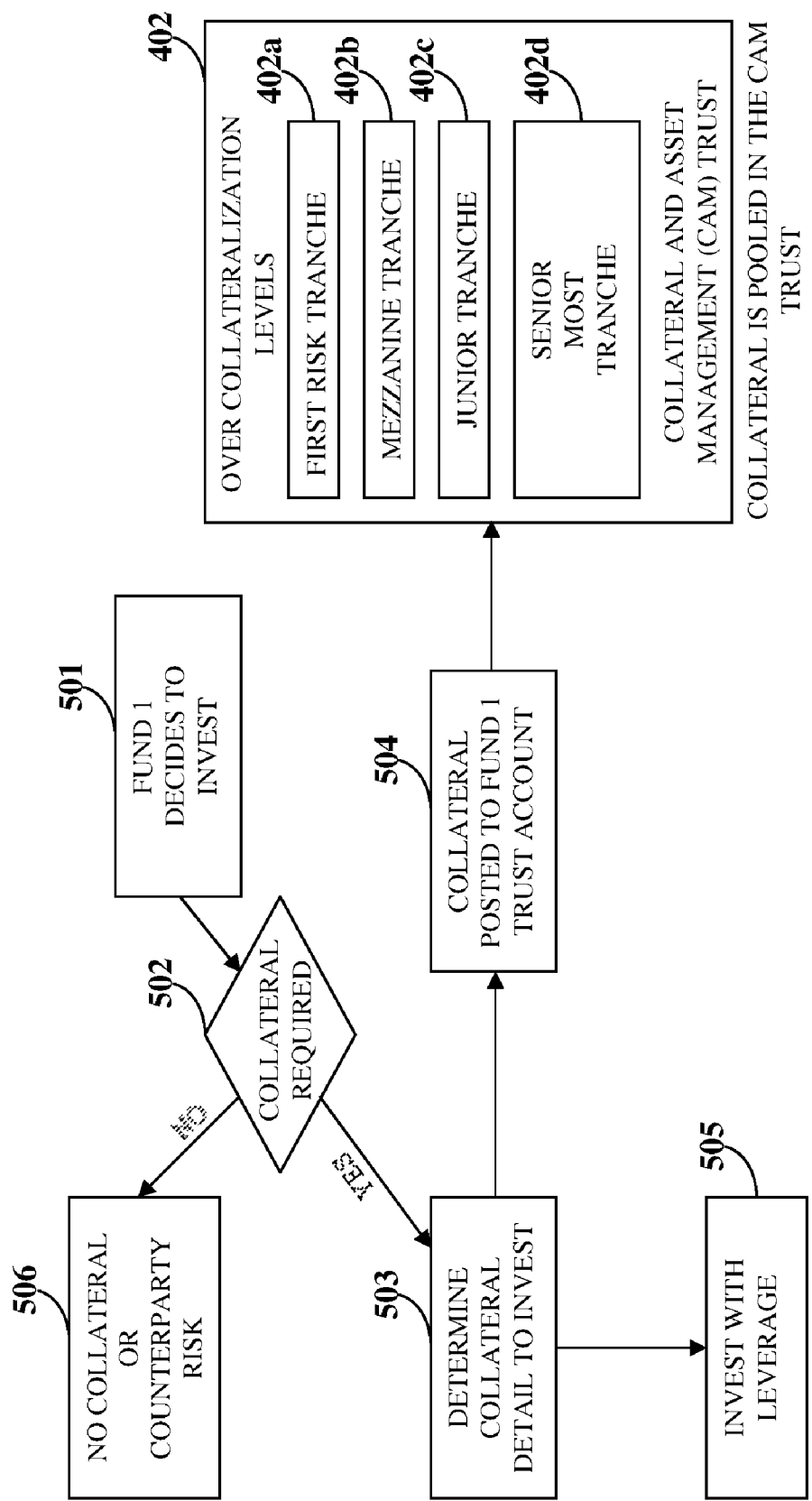
FIGS. 5A-5B exemplarily illustrate a process flow diagram comprising the steps involved in collateral flows and funding associated with collaterals held by counterparties.
Figure 5B:
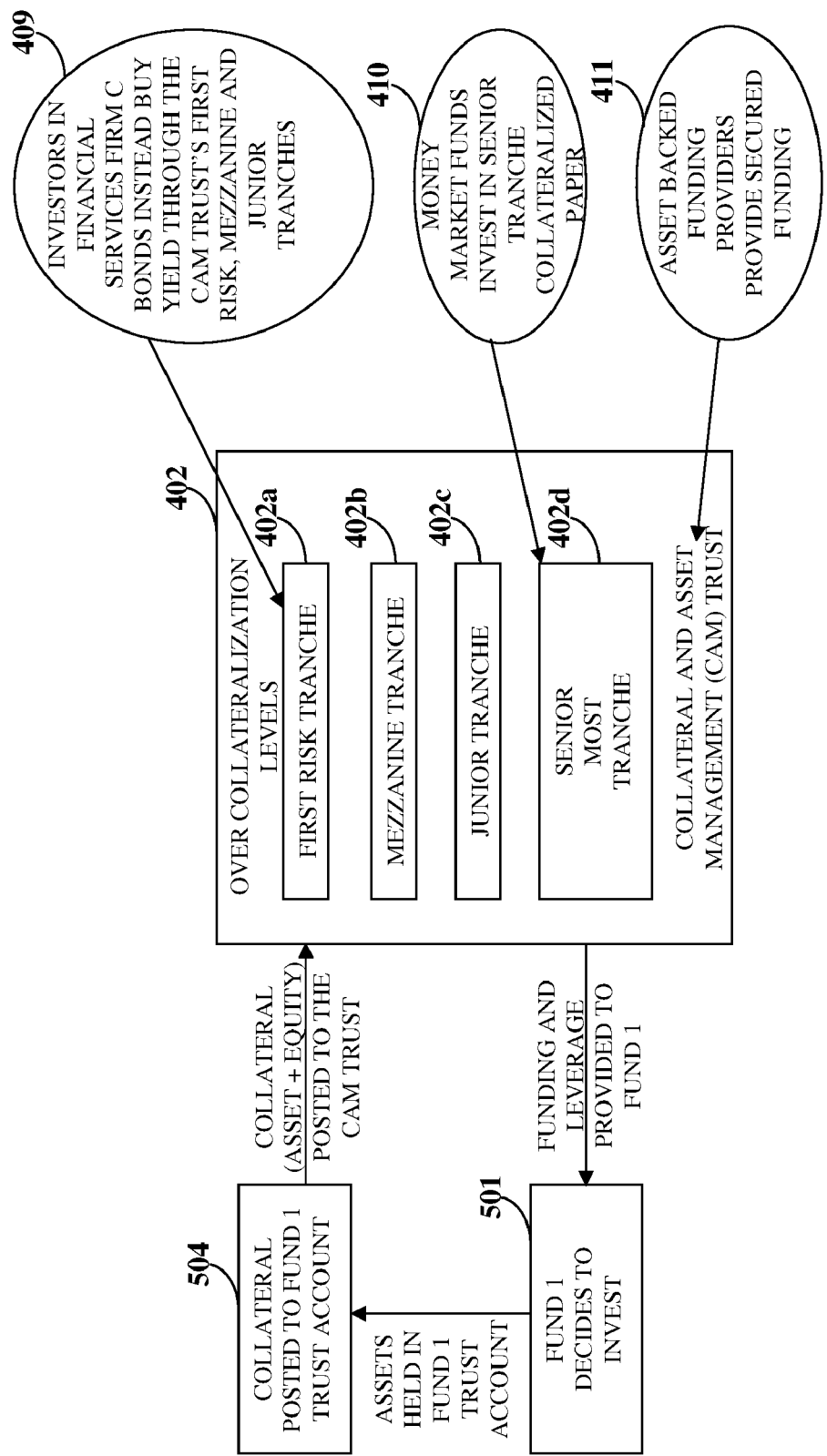

FIGS. 5A-5B exemplarily illustrate a process flow comprising the steps involved in collateral flows and funding associated with collaterals held by counterparties 203 and 205. An alternative asset manager "A" 401 of a fund counterparty 203, for example, an alternative asset management firm, manages multiple funds, for example, fund 1 401*a*, fund 2 401*b*, and fund 3 401*c* as exemplarily illustrated in FIG. 4. A fund, for example, fund 1 401*a*, decides to invest 501 in assets and approaches the collateral trust management system 201 comprising a central collateral trust, herein referred to as a collateral and asset management (CAM) trust 402, and multiple trust accounts. The collateral trust management system 201 oversees the operations of the CAM trust 402 and the trust accounts. The collateral trust management system 201 determines collateral required 502 to be pledged by fund 1 401*a* to proceed with the investment and existence of possibility of collateral risk. If the collateral trust management system 201 decides that no collateral needs to be pledged by fund 1 401*a*, there is no collateral or counterparty risk 506 involved. If the collateral trust management system 201 decides that collateral needs to be pledged by fund 1 401*a*, the amount of collateral is determined 503 in addition to any leverage 505 necessary to perform the investment. The collateral thus determined is posted 504 in one of the trust accounts, for example, fund 1 trust account 404 associated with fund 1 401*a*. The trust account associated with fund 1 401*a* posts the collateral to the CAM trust 402. The collateral is pooled in the CAM trust 402. The collateral trust management system 201 securitizes the risk of default of the trust account associated with fund 1 401*a* by synthetically repackaging the risk of default into multiple fixed income securities to be sold to the investors, for example, financial services firms and investors, based on over-collateralization levels. The fixed income securities are classified based on the level of risk associated with each of the fixed income securities and sold accordingly to the investors. For example, investors in financial services firm C bonds instead buy yield 409 through the CAM trust 402 backed first risk tranches 402*a*, mezzanine tranches 402*b*, and junior tranches 402*c*. Money market funds invest 410 in low yield senior most tranches 402*d*, for example, senior tranche collateralized paper. The asset backed investors provide 411 secured funding to the CAM trust 402, which in turn provides funding and leverage to the fund 1 401*a*. The additional funding provided to fund 1 401*a* is held in the trust account associated with fund 1 401*a*.

The method and system 200 disclosed herein is implemented over a network 204 using computing devices comprising two or more processors, memory, input devices 307, output devices 310, and network devices. The alternative asset manager "A" 401, the counterparties 203 and 205, and the financial regulators interact with the collateral trust management system 201 and the central server 202 through a combination of input devices 307, for example, a keyboard, a mouse, etc. of their computing devices. The computing devices are, for example, personal computers, laptops, mobile phones, personal digital assistants, etc. The processor 301 of the collateral trust management system 201 processes the inputs and provides outputs via a combination of output devices 310, for example, display devices, sound devices, etc. The computing devices communicate with other computing devices and the central server 202 over the network 204, for example, the internet, using the network devices. The trust accounts are managed by the collateral trust management system 201 electronically to monitor the transfer of funds. The alternative asset manager "A" 401 provides inputs via the input devices 307 to the computer system 300 regarding the amount of funds to be transferred to the trust accounts, etc. The outstanding size of positions, strategies, and leverage levels of each of the trust accounts are updated electronically onto the central server 202 over the network 204. The financial regulators access the reports generated by the reporting module 202*b* on the issues related to systemic risk regulation, for example, centralized marking standards, collateral standards, and product innovation over the network 204.

The collateral trust management system 201 embodies a centralized entity that all financial services firms and alternative asset management firms face, whenever there is any counterparty risk in any transaction involving financial services firms and alternative asset management firms. All the counterparty risk exposures associated with the transaction involving financial services firms and alternative asset management firms, are consolidated into the central collateral trust, and are securitized into tranched fixed income securities and sold as tranched bonds to investors. The collateral trust management system 201 also securitizes pools of risk that are difficult to aggregate due to market competition, by having a centralized place to pool the risk and provides a way to centralize and standardize marking of different portfolios across financial institutions. Furthermore, the collateral trust management system 201 is used to prevent fraud on investors by providing centralized verification of assets held on behalf of the investors.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the database 202*a*, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein Likewise, object methods or behaviors of a database can be used to implement various processes, such as the described herein. In addition, the databases may, in a known manner, be stored locally or remotely from a device that accesses data in such a database.

The present invention can be configured to work in a networked environment including a computer that is in communication, via the network 204, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method for managing counterparty risks associated with one or more collaterals held by a plurality of counterparties and minimizing systemic risk, comprising:

implementing a collateral trust management system by one or more processors on a computer system that functions independently from financial services firms and manages a plurality of operations related to a business process, wherein said collateral trust management system is configured for:

creating and maintaining a plurality of trust accounts in a database for holding one of assets associated with each of one or more fund counterparties and collaterals from each of one or more derivative counterparties; and creating and maintaining a central collateral trust for providing funding to each of said trust accounts for said assets and for exposing said assets in said collateral trust management system;

assigning each of said trust accounts by said collateral trust management system to one of each of said fund counterparties and each of said derivative counterparties, wherein each of said trust accounts comprises one of assets associated with a fund managed by an asset manager and said collaterals associated with said derivative counterparties;

determining leverage for each of said trust accounts based on risk based stress tests of portfolios of one of each of corresponding fund counterparties and each of corresponding derivative counterparties, and types of investment strategies employed by one of each of said corresponding fund counterparties and each of said corresponding derivative counterparties;

managing leverage levels of each of said trust accounts, wherein managing said leverage levels comprises:

one of liquidating said assets in said trust accounts by said asset manager and having said asset manager provide additional equity to said collateral trust management system; and receiving backstop by global central banks for stabilizing said collateral trust management system;

calculating one or more of risk of said assets in said trust accounts, funding requirements for said assets, and amount of each of said collaterals to be posted for external funding provided to each of said trust accounts, based on one or more of risk and leverage stress tests of one of said trust accounts of each of said corresponding fund counterparties and each of said corresponding derivative counterparties, and said types of investment strategies employed by one of each of said corresponding fund counterparties and each of said corresponding derivative counterparties;

pooling at least one of said collaterals, equity, and said assets into said central collateral trust and rehypothecating said assets based on said calculation, for obtaining financing for said trust accounts; and securitizing risk of default of one or more of said trust accounts using said collateral trust management system, wherein each of said trust accounts pays a predetermined fee to said central collateral trust for protection against default of leverage and said counterparty risk;

whereby said collateral trust management system manages said counterparty risks associated with said one or more collaterals held by said counterparties and minimizes systemic risk.

2. The computer implemented method of claim 1, further comprising managing day to day changes in one or more of contents of said trust accounts, collateral requirements for each of said trust accounts, and funding and derivative counterparty risk for said collateral trust management system via said central collateral trust.

3. The computer implemented method of claim 1, wherein said collateral trust management system provides: funding to each of said trust accounts based on risk levels of said assets in said each of said trust accounts according to pre-agreed terms with said each of said trust accounts; and counterparty risk guarantees to each of said trust accounts based on said predetermined fee paid by said each of said trust accounts to said collateral trust management system.

4. The computer implemented method of claim 3, wherein cost of said funding and said counterparty risk guarantees are predetermined by extent of leverage utilized, said risk associated with said assets in said trust accounts, and a structuring fee.

5. The computer implemented method of claim 1, wherein said funding and said collaterals of each of said trust accounts are jointly managed by said collateral trust management system and one of said asset manager and each of said derivative counterparties.

6. The computer implemented method of claim 1, wherein said securitization of said risk of default of one or more of said trust accounts comprises repackaging said risk of default synthetically into a plurality of fixed income securities, enabling rating of said fixed income securities by fixed income bond rating agencies, and selling said fixed income securities to investors, wherein said fixed income securities are classified based on individual level of risk.

7. The computer implemented method of claim 6, wherein each of said fixed income securities comprises first risk tranches, mezzanine tranches, junior tranches, and senior tranches, wherein said first risk tranches, said mezzanine tranches, and said junior tranches are sold to yield seeking investors, and wherein said senior tranches are sold to low yield, high stability seeking investors, and wherein maturity, rolls, terms, and leverage levels of said assets are standardized, and wherein yields from said fixed income securities are based on market pricing, and wherein fees paid to said central collateral trust by said trust accounts are distributed to holders of tranched fixed income securities based on a predetermined formula.

8. The computer implemented method of claim 7, wherein said collateral trust management system coordinates with one of external brokers and dealers to generate markets for said tranched fixed income securities and provides transparency and funding to said markets.

9. The computer implemented method of claim 7, wherein sum of said fees is distributed to investors based on a predetermined formula, wherein said investors are one of representatives purchasing securities and representatives providing said funding.

10. The computer implemented method of claim 1, wherein said collateral trust management system operates as a central counterparty to perform said operations.

11. The computer implemented method of claim 1, wherein said collateral trust management system manages said leverage levels of each of said trust accounts in accordance with terms of securities sold to investors, wherein said additional equity is provided to maintain said leverage levels and prevent a default, and wherein said backstop stabilizes said collateral trust management system resulting from an abruptly ceased funding crisis.

12. The computer implemented method of claim 1, further comprising liquidating said assets in said trust accounts by said collateral trust management system and distributing realized losses to investors in case of default.

13. The computer implemented method of claim 1, further comprising maintaining a database in association with said collateral trust management system for providing financial holdings details of each of said trust accounts to each of said counterparties.

14. The computer implemented method of claim 13, further comprising storing and reporting one or more of outstanding size of positions, strategies, risk parameters, collateral requirements, leverage levels, and said financial holdings details associated with said trust accounts by a central server associated with said collateral trust management system.

15. The computer implemented method of claim 1, wherein said collateral trust management system is backstopped by global central banks to prevent said systemic risk resulting from abrupt absence of refinancing by an investor crisis.

16. The computer implemented method of claim 1, further comprising: determining requirement of posting of additional collaterals to said central collateral trust by said counterparties; and performing one of processing said posting of said additional collaterals by rehypothecating said assets in said collateral trust management system, and liquidating said assets posted to raise said additional collaterals, wherein said additional collaterals maintain leverage levels for each of said trust accounts to prevent default.

17. The computer implemented method of claim 1, wherein said collateral trust management system provides information to said one or more financial regulators to aid them in managing said systemic risk and understanding impact of said systemic risk.

18. The computer implemented method of claim 1, further comprising providing a graphical user interface for displaying at least said determined leverage and said calculated risk of said assets in said trust accounts, said funding requirements for said assets, and said amount of each of said collaterals to be posted for external funding provided for each of said trust accounts, to said counterparties.

19. A computer implemented system for managing counterparty risks associated with one or more collaterals held by a plurality of counterparties and minimizing systemic risk, comprising:
- a collateral trust management system implemented on a computer system comprising one or more processors, said computer system connected to a network for enabling said collateral trust management system to access said network to function independently from financial services firms and manage a plurality of operations related to a business process, said collateral trust management system comprising:
  - a trust account maintenance module implemented by said processors to create and maintain a plurality of trust accounts managed by said collateral trust management system, wherein each of said trust accounts holds one of assets associated with each of one or more fund counterparties and collaterals from each of one or more derivative counterparties;
  - a central collateral trust maintenance module implemented by said processors to create and maintain a central collateral trust that provides funding to each of said trust accounts for said assets and exposes said assets managed by said collateral trust management system, wherein at least one of said collaterals, equity, and said assets are pooled into said central collateral trust and said assets are rehypothecated for obtaining financing for said trust accounts;
  - an assignment module implemented by said processors to assign each of said trust accounts managed by said collateral trust management system to one of each of said fund counterparties and each of said derivative counterparties, wherein each of said trust accounts comprises one of assets associated with a fund managed by an asset manager and said collaterals associated with said derivative counterparties;
  - a stress test module implemented by said processors to determine leverage for each of said trust accounts based on risk based stress tests of portfolios of one of each of corresponding fund counterparties and each of corresponding derivative counterparties, and types of investment strategies employed by one of each of said corresponding fund counterparties and each of said corresponding derivative counterparties, wherein leverage levels of each of said trust accounts is managed, and wherein managing said leverage levels comprises:
    - one of liquidating said assets in said trust accounts by said asset manager and having said asset manager provide additional equity to said collateral trust management system; and
    - receiving backstop by global central banks for stabilizing said collateral trust management system;
  - a calculation module implemented by said processors to calculate one or more of risk of said assets in said trust accounts, funding requirements for said assets, and amount of each of said collaterals to be posted for external funding provided to each of said trust accounts, based on one or more of risk and leverage stress tests of one of said trust accounts of each of said corresponding fund counterparties and each of said corresponding derivative counterparties, and said types of investment strategies employed by one of each of said corresponding fund counterparties and each of said corresponding derivative counterparties; and
  - a securitization module implemented by said processors to securitize risk of default of one or more of said trust accounts, wherein each of said trust accounts pays a predetermined fee to said central collateral trust for said leverage and protection against said risk of default.

20. The computer implemented system of claim 19, wherein said securitization module comprises: a repackaging module that synthetically repackages said risk of default into a plurality of fixed income securities, enables rating of said fixed income securities by fixed income bond rating agencies, and sells said fixed income securities to investors, wherein said fixed income securities are classified based on individual level of risk; and a liquidation module that liquidates said portfolios of one of each of said corresponding fund counterparties and each of said corresponding derivative counterparties and distributes realized losses to investors in case of default.

21. The computer implemented system of claim 19, further comprising a collateral and funding management module performs one or more of the steps of: managing day to day changes in one or more of contents of said trust accounts, collateral requirements for each of said trust accounts, and funding and counterparty risk for said collateral trust management system; determining requirement of posting of additional collaterals to said central collateral trust by said counterparties to maintain leverage levels of each of said trust accounts and prevent default of said trust accounts; processing posting of said additional collaterals by rehypothecating said assets in said collateral trust management system; and liquidating said assets posted to raise said additional collaterals on requiring said posting of additional collaterals.

22. The computer implemented system of claim 19, wherein said collateral trust management system is associated with a central server via a network, wherein said central server comprises: a database that stores one or more of outstanding size of positions, strategies, risk parameters, collateral requirements, leverage levels, and financial holdings details associated with each of said trust accounts; and a reporting module that reports on one or more of said outstanding size of positions, said strategies, said risk parameters, said collateral requirements, said leverage levels, and said financial holdings details associated with each of said trust accounts.

23. The computer implemented system of claim 19, further comprising a graphical user interface that displays at least said determined leverage and said calculated risk of said assets in said trust accounts, said funding requirements for said assets, and said amount of each of said collaterals to be posted for external funding provided for each of said trust accounts to said counterparties.

24. The computer implemented system of claim 19, wherein said collateral trust management system utilizes at least said trust account maintenance module and said central collateral trust maintenance module to provide: funding to each of said trust accounts based on risk levels of said assets in said each of said trust accounts according to pre-agreed terms with said each of said trust accounts; and counterparty risk guarantees to each of said trust accounts based on said predetermined fee paid by said each of said trust accounts to said collateral trust management system.

25. A computer program product comprising computer executable instructions implemented by a processor, said computer executable instructions embodied in a non-transitory computer readable storage medium, wherein said computer program product comprises:

a first computer readable program code for providing a collateral trust management system that functions independently from financial services firms and manages a plurality of operations related to business process of said collateral trust management system;

a second computer readable program code for creating and maintaining a plurality of trust accounts for holding one of assets associated with each of one or more fund counterparties and collaterals from each of one or more derivative counterparties in said collateral trust management system;

a third computer readable program code for creating and maintaining a central collateral trust for providing funding to each of said trust accounts for said assets and for exposing said assets in said collateral trust management system;

a fourth computer readable program code for assigning each of said trust accounts by said collateral trust management system to one of each of fund counterparties and each of derivative counterparties;

a fifth computer readable program code for determining leverage for each of said trust accounts based on risk based stress tests of portfolios of one of each of corresponding fund counterparties and each of corresponding derivative counterparties, and types of investment strategies employed by one of each of said corresponding fund counterparties and each of said corresponding derivative counterparties, wherein leverage levels of each of said trust accounts is managed, wherein managing said leverage levels comprises:

one of liquidating said assets in said trust accounts by said asset manager and having said asset manager provide additional equity to said collateral trust management system; and receiving backstop by global central banks for stabilizing said collateral trust management system;

a sixth computer readable program code for calculating one or more of risk of said assets in said trust accounts, funding requirements for said assets, and amount of each of said collaterals to be posted for external funding provided for each of said trust accounts;

a seventh computer readable program code for pooling at least one of said collaterals, equity, and said assets into said central collateral trust and rehypothecating said assets based on said calculation, for obtaining financing for said trust accounts;

an eighth computer readable program code for managing day to day changes in one or more of contents of said trust accounts, collateral requirements for each of said trust accounts, and funding and derivative counterparty risk for said collateral trust management system; and a ninth computer readable program code for securitizing risk of default of one or more of said trust accounts using said collateral trust management system, wherein each of said trust accounts pays a predetermined fee to said central collateral trust for protection against default of leverage and counterparty risk.

\* \* \* \* \*